United States Patent
Briggs et al.

(10) Patent No.: US 7,185,135 B1
(45) Date of Patent: Feb. 27, 2007

(54) USB TO PCI BRIDGE

(75) Inventors: Randall Don Briggs, Boise, ID (US); David A. Podsiadlo, San Diego, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 358 days.

(21) Appl. No.: 10/194,206

(22) Filed: Jul. 12, 2002

(51) Int. Cl.
*G06F 13/36* (2006.01)

(52) U.S. Cl. ..................... 710/315; 710/313

(58) Field of Classification Search ........... 710/305, 710/306, 311, 313, 315
See application file for complete search history.

(56) References Cited

U.S. PATENT DOCUMENTS

| | | | | |
|---|---|---|---|---|
| 5,875,313 A * | 2/1999 | Sescila et al. | ............. | 710/305 |
| 5,900,016 A * | 5/1999 | Ghosh | ............. | 711/143 |
| 6,101,566 A * | 8/2000 | Woods et al. | ............. | 710/315 |
| 6,226,700 B1 * | 5/2001 | Wandler et al. | ............. | 710/312 |
| 6,442,643 B1 * | 8/2002 | Deal | ............. | 710/315 |
| 6,473,663 B2 * | 10/2002 | Gulick | ............. | 700/94 |
| 6,484,281 B1 * | 11/2002 | Wang et al. | ............. | 714/733 |
| 6,549,966 B1 * | 4/2003 | Dickens et al. | ............. | 710/300 |
| 6,564,329 B1 * | 5/2003 | Cheung et al. | ............. | 713/322 |
| 6,618,782 B1 * | 9/2003 | Gulick et al. | ............. | 710/305 |
| 6,658,520 B1 * | 12/2003 | Bennett | ............. | 710/312 |
| 6,779,070 B2 * | 8/2004 | Connor et al. | ............. | 710/315 |
| 6,904,530 B2 * | 6/2005 | Frank | ............. | 713/300 |
| 2001/0011312 A1 * | 8/2001 | Chu | ............. | 710/64 |
| 2001/0018721 A1 * | 8/2001 | McKenna et al. | ............. | 710/126 |
| 2002/0029303 A1 * | 3/2002 | Nguyen | ............. | 709/327 |
| 2002/0184429 A1 * | 12/2002 | Chang et al. | ............. | 710/313 |
| 2003/0005197 A1 * | 1/2003 | Abramson et al. | ............. | 710/300 |
| 2003/0023800 A1 * | 1/2003 | Knaack et al. | ............. | 710/300 |
| 2003/0046499 A1 * | 3/2003 | Lin | ............. | 711/154 |
| 2003/0083013 A1 * | 5/2003 | Mowery et al. | ............. | 455/41 |
| 2003/0177294 A1 * | 9/2003 | Russell | ............. | 710/62 |
| 2003/0208653 A1 * | 11/2003 | Butcher et al. | ............. | 710/306 |

FOREIGN PATENT DOCUMENTS

JP  2002149408 A * 5/2002
KR  2003034275 A * 5/2003

OTHER PUBLICATIONS

Knudsen, Peter Voigt, et al., "Integrating Communication Protocol Selection with Partitioning in Hardware/Software Codesign," 1998, IEEE Computer Society, Proceedings of the 11th Int'l Symposium on Systems Synthesis, p. 111-116.*

(Continued)

*Primary Examiner*—Rehana Perveen
*Assistant Examiner*—Nimesh G. Patel
(74) *Attorney, Agent, or Firm*—Marger, Johnson, & McCollom, PC

(57) ABSTRACT

A USB to PCI bridge preferably includes a USB interface, a PCI interface, and an on-board processor configured to manage data flow between the interfaces. Firmware is preferably provided and configured to translate signals between the USB and PCI interfaces. The bridge can also include an internal memory configured to store instructions and data. A PCI central resource can be provided to enable hosting of a PCI subsystem. In a preferred embodiment, a plurality of PCI targets can be connected to a USB port through the bridge.

16 Claims, 7 Drawing Sheets

OTHER PUBLICATIONS

"Lucent Technologies Introduces Universal Serial Bus Chip," May 18, 1998, Lucent Technologies, available at: http://www.lucent.com/press/0598/980518.mea.html.*

"What is Firmware?: A Word Definition from Webopedia Computer Dictionary," Oct. 30, 2001, www.webopedia.com.*

"Bridge" (Definition of), IEEE 100: The Authoritative Dictionary of IEEE Standards Terms, 2000, 7th Edition, p. 118-119.*

Mitchell, Bradley, "Introduction to Hubs: Part 1—Introduction to Key Features," Feb. 14, 2005, available at www.about.com (2 pages).*

\* cited by examiner

FIG. 6

| PCI Card Mode | Description | Type | Notes |
|---|---|---|---|
| CLK | standard PCI | I | |
| REQ# | standard PCI | O | CR_REQ#[2] (in) in PCI CR mode |
| GNT# | standard PCI | I | CR_GNT#[2] (out) in PCI CR mode |
| IDSEL# | standard PCI | I | |
| INTA# | standard PCI | O | CR_INT# (in) in PCI CR mode |
| RST# | standard PCI | I | CR_RST# (out) in PCI CR mode |
| AD[31:0] | standard PCI | I/O | |
| C/BE#[3:0] | standard PCI | I/O | |
| PAR | standard PCI | I/O | |
| FRAME# | standard PCI | I/O | |
| TRDY# | standard PCI | I/O | |
| IRDY# | standard PCI | I/O | |
| STOP# | standard PCI | I/O | |
| DEVSEL# | standard PCI | I/O | |
| PERR# | standard PCI | I/O | |
| SERR# | standard PCI | I/O | |
| CR_CLK[3:0] | central resource PCI | O | |
| CR_REQ#[1:0] | central resource PCI | I | |
| CR_GNT#[1:0] | central resource PCI | O | |
| USBXTAL[3:0] | oscillator, inc analog pins | | analog |
| USBPHY[3:0] | macrocell connections | | analog |
| Tx | Serial transmit | O | |
| Rx | Serial receive | I | |
| DSR | Serial hardware handshake | O | |
| DTR | Serial hardware handshake | I | |
| SPI_CS | serial EEPROM chip select | O | |
| SPI_SCK | serial EEPROM clock | O | |
| SPI_SI | serial EEPROM data in | I | |
| SPI_SO | serial EEPROM data out | O | |
| GPIO1 | Dedicated GPIO | I/O | only in 160 |
| GPIO0 | Dedicated GPIO | O | only in 160 |
| TCK | JTAG debug | I | |
| TDI | JTAG debug | I | |
| TDO | JTAG debug | O | |
| TMS | JTAG debug | I | |
| TRST | JTAG debug | I | |
| MEM_DATA(15:0) | SDRAM – x16 data | I/O | only in 160 QFP |
| MEM_MA(18:0) | SDRAM – incl. broadside addr | O | only in 160 QFP |
| MEM_SDDQM(1:0) | SDRAM | O | only in 160 QFP |
| MEM_nSDRAS | SDRAM | O | only in 160 QFP |
| MEM_nSDCS | SDRAM | O | only in 160 QFP |
| MEM_nSDCAS | SDRAM | O | only in 160 QFP |
| MEM_SDCKE | SDRAM | O | only in 160 QFP |
| MEM_SDCLK | SDRAM | O | only in 160 QFP |
| MEM_nCE | SDRAM | O | only in 160 QFP |
| MEM_nWE | SDRAM | O | only in 160 QFP |
| MEM_nOE | SDRAM | O | only in 160 QFP |
| PowerOnReset | from power-on reset part | I | |
| ScanEn | | I | |
| Testmode[2:0] | Normal and test modes | I | |

FIG. 7

USB TO PCI BRIDGE

BACKGROUND OF THE INVENTION

1. Field of the Invention

The present invention relates to a bridging circuit for translating between signal formats. More particularly, this invention relates to a bridge for translating between a Universal Serial Bus (USB) signal format and a Peripheral Component Interconnect (PCI) signal format.

2. Description of Related Art

A USB provides a high bandwidth serial bus for connecting numerous peripherals (such as external CD-ROM drives, printers, modems, mice, keyboards, and so forth) to a PC through a single, general-purpose port. The USB format supports hot plugging, automatic device identification, and multiple data streams. There are presently three USB speeds, low speed (1.5 Mbits/sec), full speed (12 Mbits/sec), and high speed (480 Mbits/sec).

A PCI local bus allows PCI-compliant expansion cards to be installed in a computer. The PCI specification allows I/O cards to be automatically identified and configured by the host system without user intervention. The PCI format provides a standard, common bus connection for a plethora of Input/Output (I/O) interface chips.

FIG. 1 is a schematic block diagram of a conventional PCI-based USB host controller 10. Referring to FIG. 1, a conventional PCI-based USB host controller 10 provides USB ports 14 to a host computer through a PCI bus 12. The PCI-based USB host controller 10 may be attached to the PCI bus 12 either through an expansion slot as an I/O card, or permanently attached on the system's main circuit board. In these controllers, the PCI interface 16 is the primary initiator of action in the system, with the USB interface 18 operating as a root hub.

SUMMARY OF THE INVENTION

According to one embodiment of the present invention, a USB to PCI bridge includes a USB interface, a PCI interface, and an on-board processor configured to manage data flow between the interfaces. Firmware is preferably provided and configured to translate protocols between the USB and PCI interfaces. The bridge can also include an internal memory configured to store instructions and data. A PCI central resource can be provided to enable hosting of a PCI subsystem that allows a plurality of PCI targets to be connected to a USB port through the bridge.

A method of connecting a PCI target to a USB port can include managing data flow between a PCI target and a USB port with an internal processor of a bridging circuit. Operating instructions and data can be stored in an internal memory of the bridging circuit. The internal processor converts between PCI and USB transfers and protocols. External memory can also be provided and used to store excess data or instructions. Various modes of operation are contemplated. In one mode, the USB interface can be treated as a bus adaptor by a host. Alternatively, the PCI target(s) connected to the PCI interface can be made visible to a host through the USB interface. Other modes of operation may also be provided.

A circuit for interfacing between a USB port and a PCI target preferably includes an on-board processor, an internal memory, and PCI and USB interfaces. The on-board processor manages data flow and can process data where necessary. The internal memory stores instructions and data. The interfaces permit connection to a PCI target and a USB bus. In a preferred embodiment, a PCI central resource can be provided to enable multiple PCI targets to be connected to a USB port. An external memory interface can be included to communicate excess instructions or data that exceed the internal memory capacity with an external memory.

BRIEF DESCRIPTION OF THE DRAWINGS

The foregoing and additional aspects and advantages of the present invention will become more readily apparent through the following detailed description of preferred embodiments, made with reference to the attached drawings, in which:

FIG. 6 is an address memory map for a 32-bit processor according to a further aspect of the preferred embodiment shown in FIG. 4; and FIG. 7 is a table providing a preferred list of Input/Output (I/O) pins for the USB to PCI bridge chip of the preferred embodiment shown in FIG. 4.

DETAILED DESCRIPTION OF PREFERRED EMBODIMENTS

The principles of the present invention will be described more fully hereinafter with reference to preferred embodiments thereof. It should be noted, however, that these embodiments are provided by way of example, and not by way of limitation, and that the embodiments disclosed herein may be modified in form and detail without departing from the principles and scope of the invention.

Figure 1:
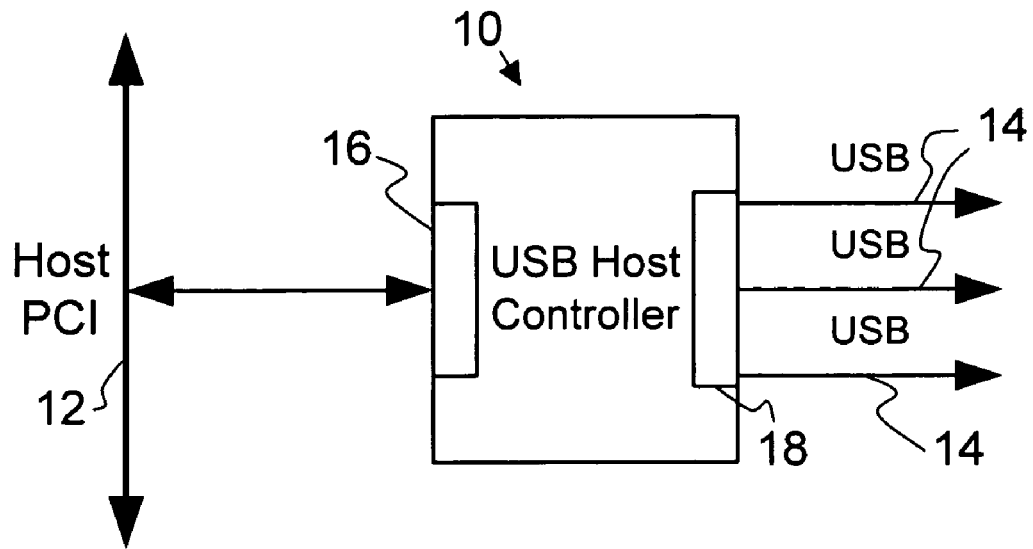
FIG. 1 is a schematic block diagram of a conventional PCI-based USB host controller.
Figure 2:
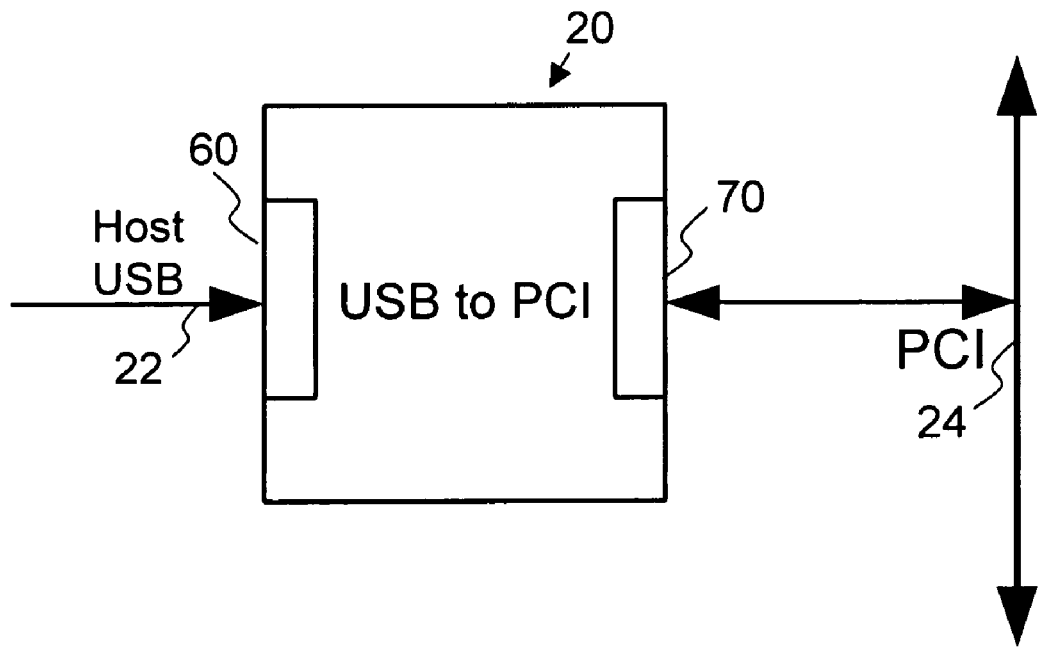
FIG. 2 is a schematic block diagram of a USB to PCI bridge according to an embodiment of the present invention.

As noted previously, FIG. 1 is a schematic block diagram of a conventional PCI-based USB host controller 10. Referring to FIG. 1, the conventional USB host controller 10 connects to a host via a PCI bus 12. A PCI interface 16 is the primary actor in the USB host controller 10, with the USB interface 18 operating as a root hub. FIG. 2 is a simplified block diagram of a USB to PCI bridge 20 of a preferred embodiment of this invention. Referring to FIG. 2, a preferred embodiment provides a complete USB to PCI bridge 20.

Referring to FIGS. 1 and 2, although the interfaces (e.g., USB 2.0, PCI 2.2) 60, 70 on the USB to PCI bridge 20 may be similar to those 16, 18 of the USB host controller 10, the USB interface 60 in the preferred embodiment operates as a slave on a USB port 22 (rather than as a root hub). Transactions coming through the USB port 22 destined for a PCI target (not shown) are translated and passed to the PCI target through the PCI bus 24 from the PCI interface 70 in the bridge 20. Because the PCI format provides a standard, common bus-connection for a plethora of I/O interface chips, various embodiments of this invention permit a large universe of inexpensive PCI-based I/O chips to be used to assemble attractive systems using native USB ports.

Figure 3:
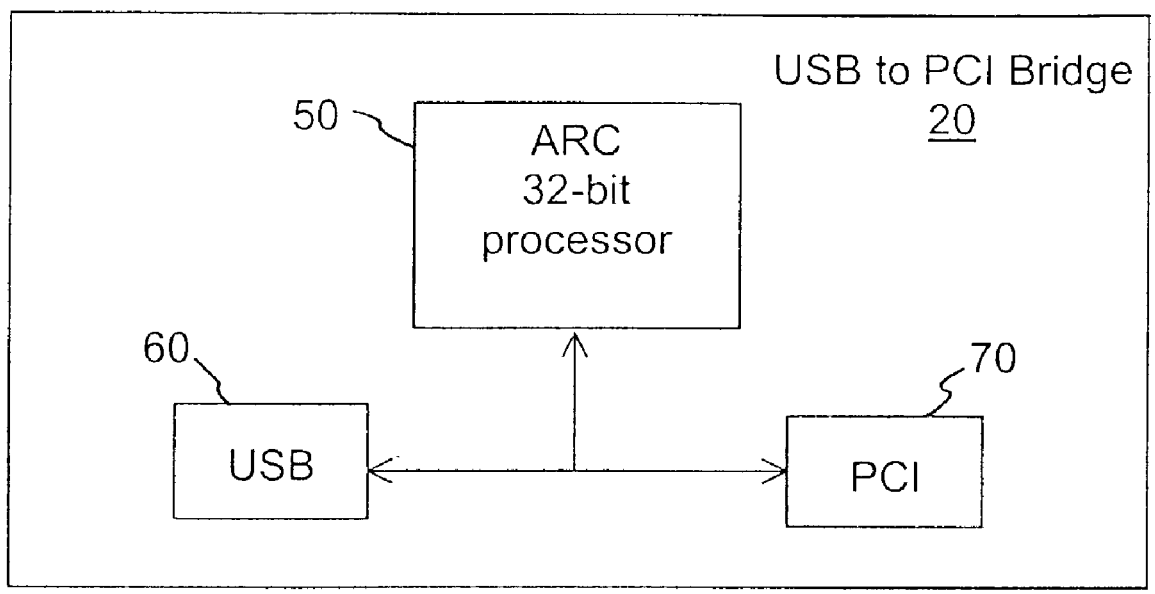
FIG. 3 is a schematic block diagram of a USB to PCI bridge having an internal processor according to another aspect of the present invention.

FIG. 3 is a schematic block diagram illustrating another preferred aspect of this invention. Referring to FIG. 3, the USB to PCI bridge 20 preferably includes a powerful integrated processor 50. In this embodiment, the processor 50 is an ARC Tangent™-A4 32 bit processor, available from ARC International. The processor 50 manages data flow between the USB interface 60 and the PCI interface 70. The processor 50 can also be configured to process data when necessary.

For many applications, data will flow directly between the USB 2.0 and PCI interfaces 60, 70 of the bridge 20. In these circumstances, the processor 50 will only serve to set up DMA transfers and handle interrupts as the DMA units complete. For other applications, however, it will be necessary for the processor 50 to "touch" (or process) the data. This processing of data will consist primarily of parsing higher-level packets such as Microsoft's Remote Network Driver Interface Specification (RNDIS) and also of presenting a USB class interface.

Figure 4:
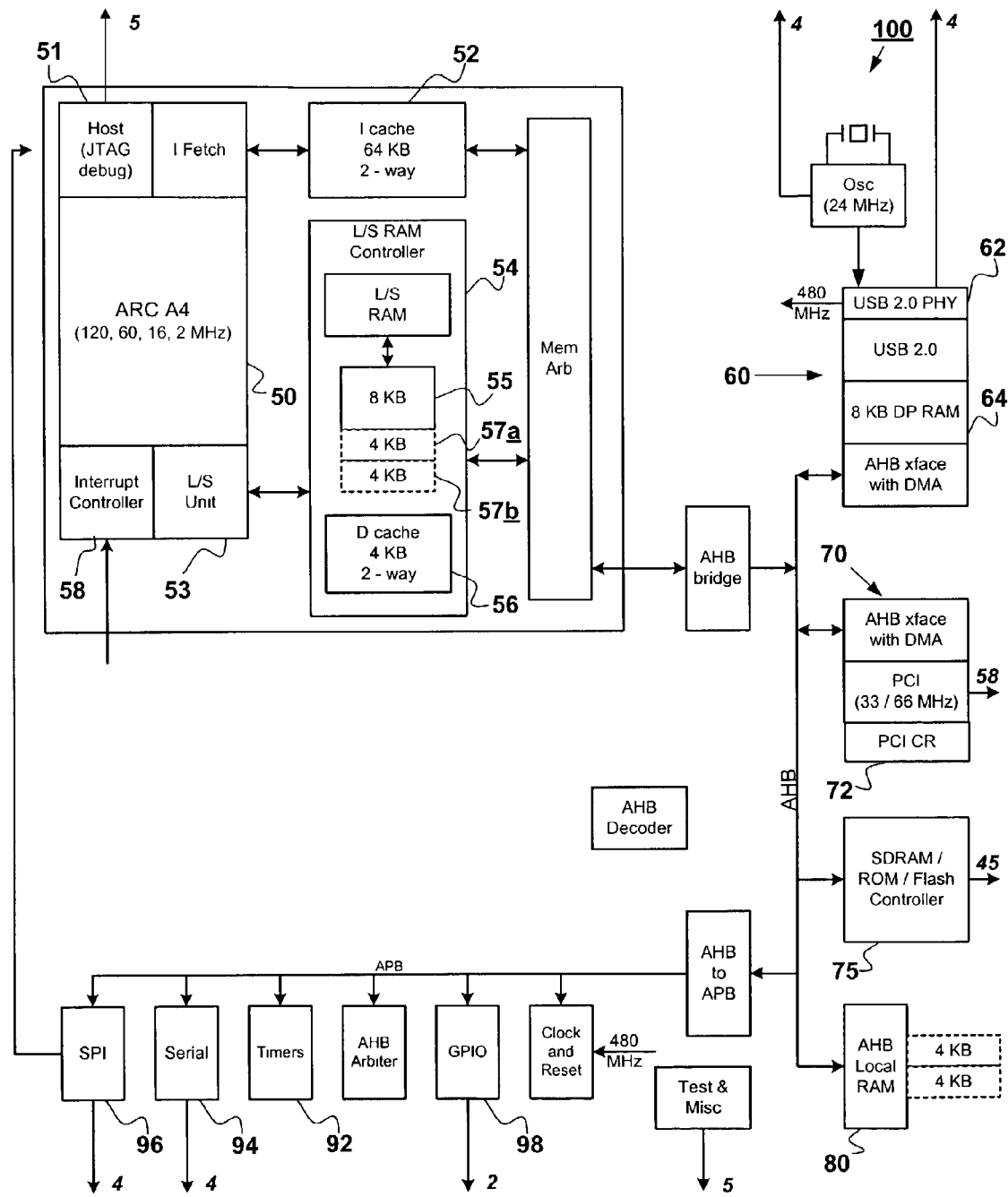
FIG. 4 is a schematic block diagram of a USB to PCI bridge circuit according to a preferred embodiment of the present invention.

FIG. 4 is a schematic block diagram of a USB to PCI bridge chip 100 for providing a bridge circuit according to a preferred embodiment of the invention. It should be noted that although the USB to PCI bridge 20 is preferably provided in a bridge chip 100, the circuit could be implemented through any other type of circuitry and need not be implemented in a chip. USB to PCI conversion capability could be provided on a PCI card in a Field Programmable Gate Array (FPGA), for example.

Referring to FIG. 4, large internal code and data Random Access Memory (RAM) spaces 52, 54 are preferably included in the chip 100 to provide the ability to internally support most applications. For large applications, however, a Synchronous Dynamic RAM (SDRAM) controller 75 can be provided. The SDRAM controller 75 is used when the internal code and/or data space 54 is not sufficient for a given application and the use of external memory is therefore required. Various packages and pin options for the bridge chip 100 will now be described in greater detail.

The bridge chip 100 can, for example, be provided in two feature/package levels. A full-featured option (shown in FIG. 4) pins out all interfaces and can be contained in a 160 pin Quad Flat Pack (QFP) package. The bridge chip can also, however, be provided in a 100 pin Thin Quad Flat Pack (TQFP) package with some of the interfaces of the 160 pin option not pinned out. The 100 pin option can be used, for instance, for cost sensitive applications where the internal RAM resources are of sufficient size to meet the customer's desired application and the SDRAM interface is not needed. Both the full featured 160 pin bridge chip and the scaled-down 100 pin package preferably include a PCI interface, a USB 2.0 interface, an on-chip processor, and internal memory.

Referring to FIG. 4, the bridge circuit 20 can be implemented on a bridge chip 100, such as a 160 pin QFP package. The full-featured bridge chip 100 preferably includes a PCI interface 70, a USB interface 60, an on-chip processor 50, and internal memory 54. The PCI interface 70 in this embodiment preferably provides a 32 bit, PCI 2.2 compatible interface operating at 3.3V at a speed of about 33 or 66 megahertz (MHz). The PCI interface 70 can further provide an optional central resource capability (CR) for operating multiple (e.g., three) PCI slots. The central resource capability will be described in more detail later with reference to FIGS. 5A and 5B. The PCI interface 70 can further provide bus mastering Direct Memory Access (DMA) capability and PCI compatible pads.

The USB interface 60 preferably supports both high speed and full speed operation, and further preferably includes an integrated Physical Layer (PHY) transceiver core 62. The USB interface 60 can, for example, include one control pipe, three interrupt pipes, and three bulk-in and three bulk-out pipes.

The on-chip processor 50 is preferably an ARC Tangent™-A4 32 bit processor with a selectable operating frequency. The frequency can be selected, for example, to be either 120, 60, 15, or 1.875 MHz. The processor further preferably provides an internal 64 kilobyte (KB) instruction cache 52, an internal 16 KB data RAM (55, 57a, 57b), and an internal 4 KB data cache 56.

An optional external SDRAM/ROM/Flash interface 75 can also be provided to the chip 100. Timers 92 and an interrupt controller 58 are also preferably included along with a serial port 94 and a Serial Peripheral Interface (SPI) port 96 for code and USB descriptor download.

Other general features of the preferred USB to PCI chip 100 include a 3.3V operating voltage and various low-power mode options. The chip 100 can also include General Purpose Input Output (GPIO) capability selectively available on many pins as well as an internal DMA data transfer capability and USB class driver support capability.

The italicized numbers in FIG. 4 indicate the number of signal pins associated with the various chip components. As indicated, the conversion chip 100 includes 131 signal pins. Of those 131 pins, the PCI interface 70 includes 58 signal pins and the SDRAM controller 75 includes 45 signal pins. The remainder of the signal pins are associated with the other chip components. An additional 31 pins are used as 4:1 supply pins, for a total of 162 pins. The chip embodiment 100 of FIG. 4 is therefore preferably provided in a 160 pin QFP, with the number of supply pins reduced by two so that the total pins matches the number of available pins in the package.

As noted previously, however, a 100 pin TQFP embodiment can also be provided for applications having less demanding requirements. In the 100 pin TQFP embodiment, the SDRAM/ROM/Flash controller interface 75 and the dedicated GPIO port (2 pins) 98 found in the 160 pin package can be removed, along with their associated supply pins. Depending on actual supply pin requirements, the GPIO port 98 may be retained (e.g., when fewer supply pins are needed), however, or a serial port 94 may be eliminated (e.g., where more supply pins are needed). Additional GPIO pins are also available to substitute in for certain ports. Table 1 summarizes the supply pins of the USB to PCI bridge chip 100 according to both the 160 pin and the 100 pin embodiments of this invention.

TABLE 1

Supply pins for USB to PCI Bridge

| What | Quantity | Notes |
| --- | --- | --- |
| Analog signals | 8 | |
| Digital signals | 123 | |
| Total signals | 131 | Analog + Digital signals (123 + 8 = 131) |
| 4:1 supply | 31 | Based on "signal" count |
| Full bondout pins | 162 | Total signals + 4:1 supply (131 + 31 = 162) Use 160 QFP |
| External RAM control pins | 45 | |
| 4:1 supply for RAM pins | 11 | |

TABLE 1-continued

Supply pins for USB to PCI Bridge

| What | Quantity | Notes |
|---|---|---|
| Dedicated GPIO ort | 2 | |
| 4:1 supply for GPIO port | 1 | |
| Partial bondout pins | 101 | Full bondout pins - RAM & GPIO pins (160 − 45 − 11 − 2 − 1 = 101) Use 100 TQFP |

As shown in Table 1, the number of full bondout pins (162) equals the number of total signals (131) plus the number of 4:1 supply pins (31). A 160 pin QFP is used for the full bondout pin option. For the partial bondout pin option, the number of partial bondout pins (101) is determined by subtracting the number of external RAM control pins (45), the number of 4:1 supply pins (11) for the RAM control pins, and the number of dedicated GPIO pins (2) and GPIO port 4:1 supply pins (1) from the 160 pins of the full bondout embodiment. The 100 pin TQFP package can therefore be used to provide the partial bondout embodiment.

Referring again to FIG. 4, a tightly coupled Load/Store (L/S) RAM 54 provides flexibility in the movement of data for processing by the processor 50. The L/S RAM 54 preferably consists of one 8 KB block 55 and a pair of 4 KB blocks 57a, 57b. The 8 KB block 55 can be used, for example, as a stack/heap or to store local variables and is accessed by the L/S unit 53. The 4 KB L/S RAM blocks 57a, 57b can be muxed into AHB space for loading/unloading of data. In other words, these blocks may appear on the AHB as a target of DMA transfers. The blocks 57a, 57b may also be muxed into the L/S space for processing. This method saves physically transferring the data between the AHB and the L/S domains. The pair of 4 KB buffers 57a, 57b can be independently located in either domain, enabling several features as described below.

Among other things, the pair of buffers 57a, 57b can be used to provide a "ping-pong" buffer. To provide a ping-pong buffer, one 4 KB buffer appears in the AHB space while the other appears in the L/S space. In this arrangement, data may be transferred from one buffer on AHB while the other buffer is being simultaneously accessed for processing in the L/S space.

The pair of 4 KB buffers 57a, 57b can also be associated together into a larger 8 KB swing buffer when a 4 KB buffer alone is not sufficient. The large 8 KB swing buffer can still be located in both spaces, but only one at a time. Although the overlapping processing/data-transfer capability of the ping-pong buffer configuration is therefore lost, a double-sized buffer is enabled.

According to another arrangement, one of the 4 KB buffers 57a or 57b can be logically concatenated onto the end of the permanent 8 KB L/S RAM 55 to provide a larger 12 KB buffer for a stack/heap or to store local variables. This arrangement still leaves a single 4 KB swing buffer for data movement.

For applications where the above-described resources do not provide sufficient capacity, an external SDRAM can be connected to the bridge chip 100 in the 160 QFP option through an SDRAM/ROM/Flash Controller 75. The data cache 56 inside the bridge chip 100 helps hide the access latency to the SDRAM.

The bridge preferably features a 64 KB instruction cache 52. For applications that do not require an external instruction Read-Only Memory (ROM), the cache can be preloaded with the application from either an external SPI Electrically Erasable Programmable ROM (EEPROM) or through the USB interface 60. The cache preload can also be done via the "host interface" 51 of the processor 50, since this interface already provides access to the internal resources of the processor 50. To preload the instruction cache 52, the processor 50 powers up in a "halt" condition and the instructions are loaded into the cache 52 using download hardware. After the instruction cache 52 has been preloaded, the download hardware then releases the processor 50 to start running. For applications that are too large for the internal instruction cache 52, an external code storage device must be used, and the instruction cache 52 functions in its normal role.

The USB to PCI bridge chip 100 is preferably configured to support up to three USB interfaces, one interface per potential PCI target, through the USB interface 60. These formal interfaces are described in the USB specification's hierarchy of descriptors (device/configuration/interface/endpoint). Each interface consists of one interrupt endpoint, one bulk-in endpoint, and one bulk-out endpoint. The bulk endpoints can instead be configured as isochronous endpoints. Eight KB of RAM storage 64 is available for the entire set of interfaces and can be allocated between the endpoints during initialization.

The storage 64 in the USB block 60 is preferably First-In-First-Out (FIFO) memory with DMA capability. Data can be transferred directly between the USB block 60 and the PCI block 70 using DMA. For applications that require data to be interpreted or modified, the data can be transferred first into a local scratchpad memory block 80 upon which the processor can act. DMA transfers in the PCI block 70 move the processed data from the scratchpad to a PCI target. Interrupts from various DMA engines are serviced by the internal processor 50 that coordinates and orchestrates the data flow. The firmware determines how to direct incoming USB requests to the PCI interface 70.

The internal processor 50 further preferably causes the PCI block 70 to run configuration cycles to probe and configure the PCI interface 70, including base address registers, and configure targets on the PCI bus, including assigning values to their base address registers. Additionally, the base address registers of the PCI interface 70 are assigned values. Each of the six base address registers are associated with one of a plurality of bulk pipes of the USB interface 60. This permits traffic initiated by an attached PCI target to be directed up to a specific USB endpoint.

Referring to FIGS. 3 and 4, the bridge circuit 20 or bridge chip 100 can include several features that support low power operation. These features can be generally classified into two categories, including clock frequency selection and clock gating of non-essential blocks. Using clock frequency selection, the ARC core 50 can be run at a selected one of a plurality of clock frequencies (e.g., 120 MHz, 60 MHz, 15 MHz, or 1.875 MHz). To conserve power, for instance, the processor 50 can be powered up at a lower frequency (e.g., 1.875 MHz). This can be done, for example, to help meet USB enumeration current limits.

The frequency can be safely changed dynamically by writing a new selection value to a register. The internal AHB/Advanced Peripheral Bus (APB) will always run at 60 MHz. When the PCI interface is not the central resource, it receives its clock from an outside source and may function all the way up to the maximum PCI clock rate (66.666

MHz). When the PCI interface is the central resource, the PCI clock frequency can be selected to be the same as the AHB/APB (60 MHz) or some fraction thereof (e.g., 30 MHz, 15 MHz, or 7.5 MHz).

According to one aspect of clock gating, the processor 50 includes a "SLEEP" instruction. A sleep mode is entered when the processor 50 encounters the SLEEP instruction. The processor 50 stays in sleep mode until an interrupt or restart occurs. During sleep mode, the pipeline ceases to change state and the RAMs are disabled to reduce power consumption. Non-essential clocks can also be switched off.

According to another aspect of clock gating, internal AHB and APB blocks may not be needed for certain applications and can have their clocks turned off. In the 100 TQFP embodiment of the bridge chip 100, for example, the SDRAM controller 75 is not even bonded out and its clock should therefore be shut off. Other blocks that can be selectively disabled include the AHB local RAM, GPIO, SPI, Serial, Timers, PCI, and PCI central resource blocks (80, 98, 96, 94, 92, 70, 72). The clocks to these blocks may be turned on and off again safely on-the-fly without glitches on the clock lines.

The PCI central resource block 72 generates four copies of the PCI clock. When the bridge chip 100 is not the central resource and when not all three PCI slots are populated, the unneeded clocks can be turned off. The bridge chip 100 may be placed in an environment where it is not the central resource and receives its clock from an outside source. This clock may be gated internally to either of the two blocks that use it (PCI central resource 72 and PCI 70). The processor 50 further preferably provides a way to power down its internal hardware debug blocks, since these will be used for code development only. These blocks can therefore be disabled in the production environment.

The bridge chip 100 can also preferably manage the power consumption of an SDRAM bank by providing a power down timer. If no SDRAM accesses are performed for a certain amount of time, the bridge chip can automatically power down the SDRAM bank. The foregoing approaches provide various ways to conserve power in the USB to PCI bridge 20 or bridge chip 100.

Referring again to FIG. 4, the bridge chip 100 also preferably provides GPIO capability. In addition to the pins of the GPIO port 98 that are dedicated for GPIO functionality, other GPIO pins can be selectively multiplexed onto several of the bridge ports including the serial port 94, the PCI central resource 72, the PCI port 70, and the RAM controller (in the 160 pin QFP embodiment).

Some of the ports can be partial GPIOs as indicated in Table 2. This allows for the possibility of gaining a few GPIO pins without dropping any port in its entirety.

TABLE 2

GPIO Pin Chart

| | | |
|---|---|---|
| Serial Port | Mode 0 | Normal operation |
| | Mode 1 | No hardware handshake DSR, DTR are GPIO |
| | Mode 2 | All four pins are GPIO |
| PCI Central Resource | Mode 0 | Three slot system - no GPIO |
| | Mode 1 | Two slot system - CR_CLK[2], CR_REQ[2], CR_GNT[2] are GPIO (3 pins) |
| | Mode 2 | One slot system - CR_CLK[2:1], CR_REQ[2:1], CR_GNT[2:1] are GPIO (6 pins) |
| | Mode 3 | Not central resource - CR_CLK[3:0], CR_REQ[1:0], CR_GNT[1:0] are GPIO (8 pins) |
| PCI | Mode 0 | PCI interface is active |
| | Mode 1 | PCI is deactivated - all PCI pins are GPIO (45 pins) except CLK, REQ#, GNT#, INTA#, and RST#. |
| RAM Controller | Mode 0 | RAM Controller is active |
| | Mode 1 | RAM Controller is deactivated - all pins are GPIO (46 pins) except MEM_CLK |

In Mode 3 of the PCI Central Resource, shown in Table 2, it appears that CR_CLK[2:0], CR_REQ[2:0], CR_GNT[2:0] would be the GPIO pins. However, several regular PCI pins take on a central resource role when in that mode. When the bridge chip is not the central resource, these pins revert back to their normal functioning, and all the dedicated central resource pins are used as GPIO pins.

The memory controller 75 of the bridge chip 100 preferably provides support for one bank of SDRAM and one bank of ROM/Flash/Static RAM (SRAM). The bridge chip 100 is internally a 32-bit device. Externally, however, the bridge chip 100 supports a 16-bit wide data path (×16) to external memory. The bridge chip packs and unpacks data to the 32-bit format using the little-endian convention. The packing of read data occurs as shown below. Write data is unpacked in a similar manner.

| External | Internal |
|---|---|
| 1$^{st}$ Read bits, 15–8 | bits 15–8 |
| 1$^{st}$ Read, bits 7–0 | bits 7–0 |
| 2$^{nd}$ Read, bits 15–8 | bits 31–24 |
| 2$^{nd}$ Read, bits 7–0 | bits 23–16 |

The following Table 3 illustrates different possible sizes for the SDRAM bank and the SDRAM parts needed to realize it.

TABLE 3

SDRAM Bank Size Chart

| | 2 MBytes | 4 Mbytes | 8 Mbytes | 16 MBytes | 32 Mbytes |
|---|---|---|---|---|---|
| SDRAM Sizes | (1) 1M × 16 (16 MBit part) | (2) 2M × 8 (16 MBit parts) | (1) 4M × 16 (64 MBit part) | (1) 8M × 16 (128 MBit part) | (1) 16M × 16 (256 MBit part) |

Firmware is responsible for configuring the memory controller with the SDRAM size, external bus width, the number of internal banks contained in the SDRAM parts, the number of CAS lines, timing profile data, and the bank's base address. As noted above, the bridge chip 100 can manage the power consumption of the SDRAM bank by providing a power down timer. If no SDRAM accesses are performed for a certain amount of time, the bridge chip 100 can power down the SDRAM bank.

As noted above, the bridge chip 100 also preferably supports one bank of either Flash, ROM, or SRAM. The bridge chip 100 packs and unpacks data for the Flash, ROM, or SRAM in the same manner as described previously with respect to the SDRAM. The Flash, ROM, or SRAM bank preferably supports up to 1 megabyte (MB) of memory. Firmware is responsible for configuring the memory controller with the timing profile data and the bank's base address. This bank supports page mode ROM devices. In order to prevent inadvertent writes to the boot section of Flash, a firmware programmable output pin (GPIO0) is preferably included in the bridge chip 100. This output may be connected on a board to a Write Protect input of a Flash device, thus safeguarding the boot block.

An instruction (I) cache data RAM 52 is preferably 2×8192×32 with an instruction (I) cache tag RAM of 2×1024×8. A data (D) cache data RAM 56 is preferably 2×512×32 and should have a byte write capability and a data (D) cache tag RAM of 2×128×32. The L/S RAM 54 is preferably 4×1024×32 and should also have the byte write capability. A USB 2.0 buffer 64 is preferably 8 KBytes DP RAM. A first port is preferably a ×16, 30 MHz port, while a second port is preferably a ×32, 66 MHz port.

Figure 5A:
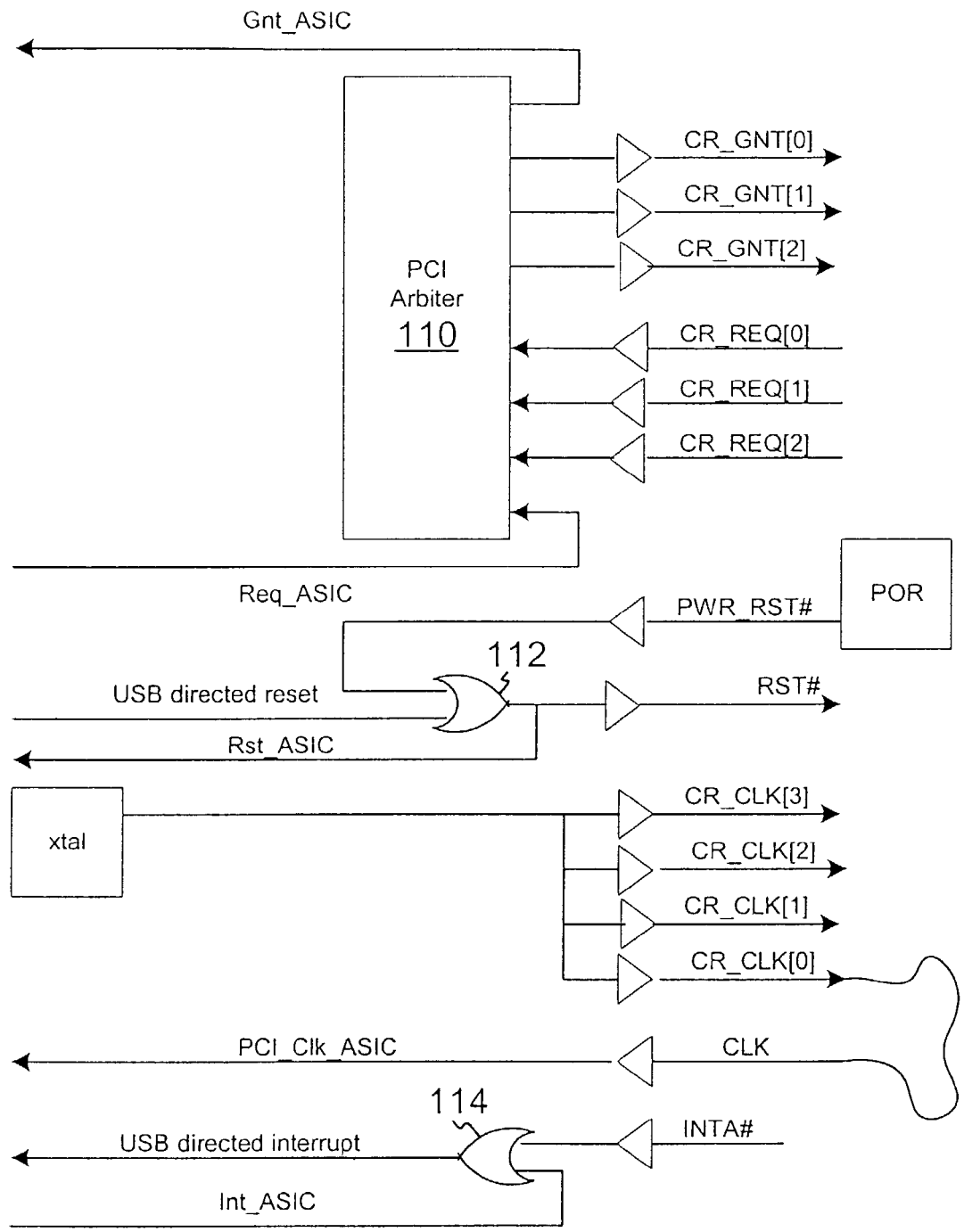
FIG. 5A is a schematic block diagram illustrating pin sharing/muxing in a PCI central resource mode of a USB to PCI bridge circuit according to yet another preferred embodiment of the present invention.
Figure 5B:
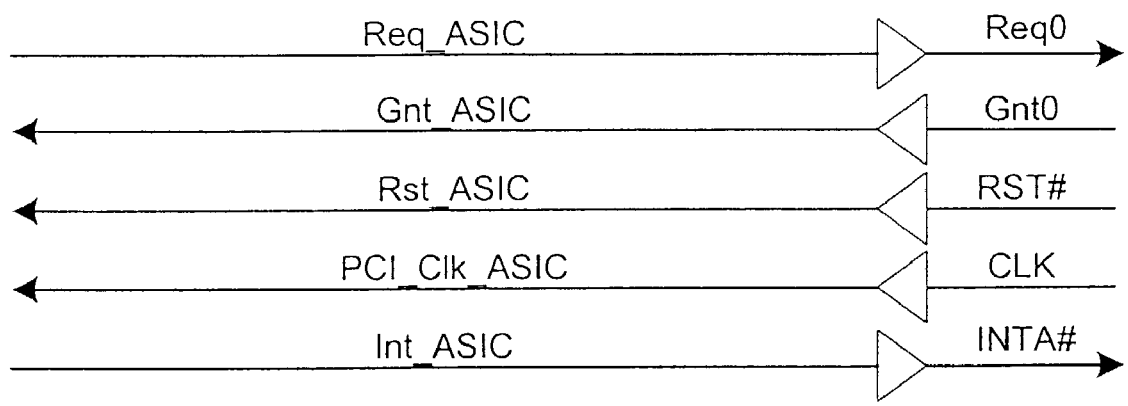
FIG. 5B is a schematic block diagram illustrating a pin configuration of a USB to PCI bridge circuit without a PCI central resource mode according to a still further aspect of the present invention.

FIG. 5A illustrates pin sharing/muxing in a central resource mode of the bridge 100 of FIG. 4. The central resource mode allows the bridge to service multiple PCI targets through a single USB port. FIG. 5B illustrates the pin configuration without the central resource mode.

Referring to FIGS. 4 and 5A, according to a preferred embodiment of the invention, a bridge circuit 100 having a PCI interface 70 equipped with a central resource mode 72 is able to communicate with up to three separate PCI targets using a PCI arbiter 110. The central resource block 72 of the PCI interface 70 preferably generates four copies CR_CLK [0], CR_CLK[1], CR_CLK[2], CR_CLK[3] of a PCI clock CLK. One of the clocks CR_CLK[0] is for internal use, while the other three clocks CR_CLK[1], CR_CLK[2], CR_CLK[3] are each used by a corresponding one of the three external PCI target slots. Writing to a register gates each of the four clocks off. The clocks may be safely turned on and off again without generating glitches on the clocks.

The PCI arbiter 110 receives request signals Req_ASIC, CR_REQ[0], CR_REQ[1], CR_REQ[2] and grants bus access through grant signals Gnt_ASIC, CR_GNT[0], CR_GNT[1], CR_GNT[2] to appropriate PCI targets in response to clock signals CR_CLK[0], CR_CLK[1], CR_CLK[2], CR_CLK[3]. Interrupt and reset signals Int_ASIC, Rst_ASIC are also controlled by the central resource through logic gates 112, 114.

Referring to FIG. 5B, where no central resource mode is provided to the PCI interface 70, there is a one-to-one correspondence between a USB port and a PCI target connected to the PCI interface 70. Only one of each of the request, grant, and clock signals are therefore required. Also in this embodiment, interrupt and reset signals Int_ASIC, Rst_ASIC are passed directly, without central resource control.

Figure 6:
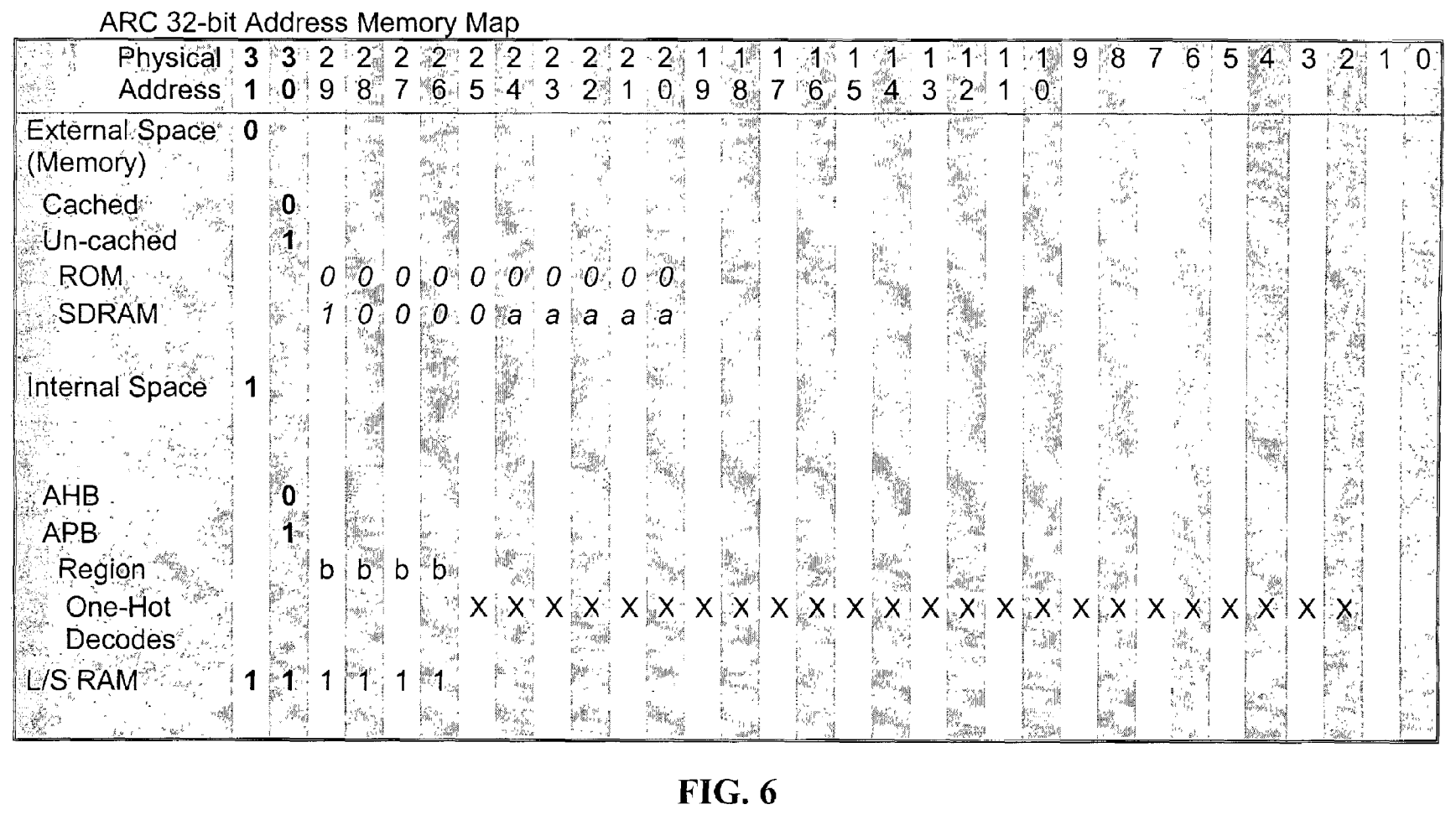

The processor 50 of the preferred embodiment shown in FIG. 4 has a 32-bit address memory map. The address memory map is allocated as shown in FIG. 6. Referring to FIGS. 4 and 6, an internal ARC Load/Store (L/S) RAM 54 consumes a single APB region. Access to this region is not reflected onto the AHB subsystem since it always "hits" inside the processor 50 itself.

According to this embodiment, the maximum internal code space 52 is 64 KB. The largest code ROM that can be addressed externally is 1 MB, and is limited by the number of pins required to address a broadside memory device. External SDRAM data space is supported up to 32 MB. The SDRAM entry in the address map lists some of the field as "aaaaa." This indicates how much of the incoming address the RAM controller compares against the base address for the SDRAM bank. Larger capacity SDRAM chips require fewer base address bits as more of the upper address lines are used to address the actual RAM itself. The internal L/S RAM space 54 is 16 KB and is located at the address indicated, occupying one of the APB addresses. This works well with the overall chip decoding methodology described herein.

AHB blocks are found in the internal AHB address space. The address locations denoted by the letters "bbbb" provide up to 16 addressable AHB blocks. Amba Advanced Peripheral Bus (APB) blocks are found in the internal APB address space. The "bbbb" address spaces also provide up to 16 addressable APB blocks. "One-hot decodes" indicates that a single bit in this address range is set per register in the target AHB/APB block. The actual locations and values of these are set in a central "memmap" file.

Referring back to FIG. 2, two different operation models for the USB to PCI bridge 20 will now be described. The difference between these models is how the USB connected host 22 views the USB interface 60 of the bridge 20. These two models include a first model in which the PCI targets are hidden from the host and a second model in which the PCI targets are visible to the host.

In the first model, the USB interface 60 is treated by the host as simply a bus adapter that reliably transports an address and data between USB 22 and PCI 24 regions. The first model makes no attempt to present the functionality of PCI target devices into the USB world. The USB device descriptors indicate that the USB to PCI bridge is simply a bus converter and makes no mention of whatever PCI functions are attached to the PCI bus. A generic transport mechanism is provided in firmware running on the bridge 20 to implement this model. One of the mass storage class protocols can be leveraged to provide this generic transport mechanism. In this model, a vendor-specific USB driver is used to implement the transport mechanism. In other words, a custom driver should be developed to utilize this model.

The second model makes attached PCI targets individually visible and supports USB Class drivers. In this model, adapting the PCI interface 70 into a USB interface 60 takes place in the firmware running on the bridge 20. The descriptors returned by the command pipe indicate the nature of the attached PCI targets. For example, if a PCI to ATA chip were attached to the bridge 20, the USB descriptor would indicate a mass storage device in its descriptor, and would provide a Mass Storage class driver interface. The primary advantage of this model is the ability to utilize built-in class drivers on popular operating systems. Compliance with USB class drivers is further encouraged by Microsoft's Window Hardware Quality Lab (WHQL) programs.

As described, the USB interface 60 can be treated as a bus adaptor by a host. Alternatively, a PCI target connected to the PCI interface 70 can be made visible to a host through the USB interface 60. Firmware is preferably provided and configured to translate signals between the USB and PCI interfaces 60, 70, respectively.

FIG. 7 is a table providing a more detailed list of Input/Output (I/O) pins for the USB to PCI bridge chip 100 of the preferred embodiment shown in FIG. 4. Referring to FIG. 7, the first column of the table provides a list of input and output signals for the chip. The second column provides a brief description of the signal or what it is used for. The third column indicates whether it is an input or output signal, or both. Finally, the fourth column provides additional brief notes regarding the signals.

In summary, as described above, a USB to PCI bridge according to one embodiment of the invention includes a USB interface, a PCI interface, and an on-board processor configured to manage data flow between the interfaces. The bridge can also include an internal memory configured to store instructions and data. A PCI central resource can also be included and configured to enable hosting of a PCI subsystem to permit a plurality of PCI targets to be connected to a USB port through the bridge. An external memory interface can be configured to provide access to external memory. The USB to PCI bridge can be implemented on a bridge chip configured to translate signals between the USB and PCI interfaces.

A method of connecting a PCI target to a USB port preferably includes managing data flow between the PCI target and the USB port using an internal processor of a bridging circuit. Operating instructions and data are preferably stored in an internal memory of the bridging circuit. The internal processor is preferably used to convert between PCI and USB signal forms. In one embodiment, multiple PCI targets can be connected to a single USB port. In another embodiment, external memory can be provided and used to store excess data and/or instructions. In one configuration, the PCI targets are hidden from a host. In another configuration, the PCI targets are visible to a host.

A circuit can also be provided for interfacing between a PCI target and a USB port. The circuit preferably includes an on-board processor, an internal memory, and PCI and USB interfaces. The on-board processor can be configured to manage data flow and process data. The internal memory can be configured to store instructions and data. The interfaces facilitate connection to a PCI target and a USB port. In one embodiment, multiple PCI targets can be connected to a USB port through the circuit. A PCI central resource can be provided and configured to enable the circuit to host a PCI subsystem. The USB interface could alternatively be configured to be viewed by a host as a bus adaptor or it can enable the PCI targets to be visible to a host. An external memory interface can be configured to send excess instructions or data to an external memory.

Various preferred aspects and embodiments of this invention have been described above. While the principles of this invention have been shown and described with reference to preferred embodiments thereof, it will be understood by those skilled in the art that various changes in form and details may be made without departing from those principles. The invention should therefore be interpreted to encompass all such variations coming within the spirit and scope of the appended claims.

What is claimed is:

1. A circuit independent from a host for interfacing between a Peripheral Component Interconnect (PCI) target and a Universal Serial Bus (USB) host port of the host, said circuit comprising:
an on-board processor configured to manage data flow and process data;
a memory configured to store instructions and data, a portion of said memory detachably coupled to the circuit;
a memory controller configured to measure time between accesses to the detachably coupled portion of the memory and to power down said portion when the measured time reaches a predetermined amount;
firmware configured to translate signals between USB and PCI protocols;
a PCI interface having the PCI target coupled thereto, the PCI target including a PCI-to-ATA translation unit and an Advanced Technology Attachment (ATA) interface connected to an ATA mass storage device that is configured to communicate with the circuit over the ATA interface, through the PCI target and over the PCI interface;
the firmware configured to communicate with the coupled PCI target to identify a PCI-to-ATA translation function provided by the coupled PCI target;
the firmware configured to send USB device descriptors to the host in response to identifying the PCI-to-ATA translation function provided by the coupled PCI target, the USB device descriptors indicating a mass storage function for the ATA mass storage device; and
a USB interface for connecting to the USB host port; wherein the PCI target communicates with the host through the USB host port;
wherein the USB device descriptors are configured to elicit installation of a mass storage class driver by the host.

2. The circuit according to claim 1, further comprising a PCI central resource configured to enable the circuit to host a PCI subsystem.

3. The circuit according to claim 1, wherein the ATA mass storage device is visible to the host.

4. The circuit according to claim 1, wherein the external memory interface is configured to send excess instructions or data to an external memory.

5. The circuit according to claim 2, further comprising multiple PCI targets connected to a single USB host port through the circuit.

6. A circuit independent from a host for interfacing between a Peripheral Component Interconnect (PCI) target and a Universal Serial Bus (USB) host port of the host, said circuit comprising:
an on-board processor configured to manage data flow and process data;
a memory configured to store instructions and data;
a memory controller configured to measure time between accesses to the memory and to power down at least a portion of the memory when the measured time reaches a predetermined amount;
firmware configured to translate signals between USB and PCI protocols;
a PCI interface having the PCI target coupled thereto, the PCI target including a PCI-to-mass storage protocol translation unit and a mass storage interface connected to a mass storage device that is configured to communicate with the circuit over the mass storage interface, through the PCI target and over the PCI interface;

a generic transport mechanism included in the firmware and configured to send USB device descriptors to the host, the USB device descriptors indicating a bus converter function for the circuit, the bus converter function operating independently of a mass storage function provided by the mass storage device; and a USB interface for connecting to the USB host port; wherein the PCI target communicates with the host through the USB host port;

wherein the USB interface is configured to be viewed by the host as a bus adaptor to conceal the mass storage function provided by the mass storage device;

wherein the USB device descriptors are configured to elicit installation of a USB driver by the host.

7. The circuit according to claim 6 wherein the PCI target is hidden from the host.

8. The circuit according to claim 7 wherein the USB interface is configured to operate as a slave on the USB port.

9. A method of operating a Universal Serial Bus (USB) to Peripheral Component Interconnect (PCI) bridge, the method comprising:

connecting a PCI target to the USB-to-PCI bridge, the PCI target including a PCI-to-mass storage protocol translation unit and a mass storage interface connected to a mass storage device that communicates with the USB-to-PCI bridge over the mass storage interface, through the PCI target and over a PCI interface;

detachably coupling the USB-to-PCI bridge to a USB port located on a host;

exchanging communications with a local memory to identify an amount of time between memory accesses;

sending power down messages to the local memory when the measured time reaches a predetermined amount;

exchanging communications with the PCI target that is connected to the USB-to-PCI bridge to identify a mass storage function for the PCI target; and sending, to the host, USB device descriptors providing the identified mass storage function;

wherein the USB device descriptors are configured to elicit installation of USB Class driver by the host.

10. The method of claim 9 further comprising:

translating USB protocol communications received from the host into PCI protocol communications; and forwarding the translated PCI protocol communications to the PCI target.

11. The method of claim 10 wherein the PCI target is visible to the host.

12. The method of claim 11 wherein the USB device descriptors provide a Mass Storage class interface.

13. The method of claim 11 wherein the USB device descriptors provide an interface between the PCI target and the USB-to-PCI bridge.

14. A circuit independent from a host for interfacing between first and second Peripheral Component Interconnect (PCI) targets and a Universal Serial Bus (USB) host port of the host, said circuit comprising:

a circuitry board having 160 pins aligned in a Quad Flat Pack (QFP) package;

firmware connected to the circuitry board and configured to translate signals between USB and PCI protocols;

an on-board processor connected to the circuitry board and configured to manage data flow and process data;

a memory connected to the circuitry board and configured to store instructions and data;

a memory controller connected to the circuitry board and configured to measure time between accesses to the memory and to power down at least a portion of the memory when the measured time reaches a predetermined amount;

an arbiter connected to the circuitry board and configured to provide direct bus access to the first PCI target for a first predefined time period in response to receiving a first bus access request corresponding to the first PCI target, the direct bus access providing direct access to a bus connecting the USB host port and the circuitry board;

the arbiter to deny the second PCI target direct bus access for the first predefined time period in response to receiving the first bus access request;

the arbiter to provide direct bus access to the second PCI target for a second predefined period in response to receiving a second bus access request corresponding to the second PCI target;

the arbiter to deny the first PCI target direct bus access for the second predefined time period in response to receiving the second bus access request;

a PCI interface connected to the circuitry board and having the first PCI target coupled thereto, the first PCI target including a PCI-to-mass storage protocol translation unit and a mass storage interface connected to a mass storage device that is configured to communicate with the circuitry board over the mass storage interface, through the first PCI target and over the PCI interface;

a generic transport mechanism included in the firmware and configured to send conceal-type USB device descriptors to the host, the conceal-type USB device descriptors indicating a bus converter function for the circuitry board, the bus converter function operating independently of a mass storage function provided by the mass storage device;

wherein the circuitry board is viewed by the host as a bus adaptor to conceal the mass storage function provided by the mass storage device;

wherein the conceal-type USB device descriptors are configured to elicit installation of a USB driver by the host.

15. The circuit according to claim 14 further comprising:

a USB interface connected to the circuitry board and structured to detachably connect to the USB host port, the USB interface including one control pipe, three interrupt pipes and six bulk transport pipes for exchanging communications between the USB host port and the first and second PCI targets;

a serial port connected to the circuitry board and configured to receive non-conceal-type USB device descriptors that identify different functions that are independent from the bus converter function; and one or more General Purpose Input Output Pins (GPIO) coupled to the serial port, the GPIO pins indicating at least a first and second mode of operation for the serial port; the first mode of operation corresponding to default operation for the serial port.

16. The circuit according to claim 15 wherein the non-conceal-type USB device descriptors identify the mass storage function.

* * * * *